United States Patent [19]

Celli

[11] Patent Number: 4,685,855
[45] Date of Patent: Aug. 11, 1987

[54] UNIVERSAL TRAILER

[76] Inventor: Giuliano Celli, 95 Wakelin Crt., Woodbridge, Ontario, Canada, L4L 1A9

[21] Appl. No.: 907,142

[22] Filed: Sep. 12, 1986

Related U.S. Application Data

[63] Continuation of Ser. No. 666,159, Oct. 29, 1984, abandoned.

[30] Foreign Application Priority Data

Nov. 1, 1983 [CA] Canada .................................... 440185

[51] Int. Cl.$^4$ .............................................. B60P 1/02
[52] U.S. Cl. ...................... 414/482; 254/10 R; 280/656; 280/47.13 R; 414/460; 414/495
[58] Field of Search ............... 414/498, 917, 469, 471, 414/473, 474, 476, 480, 481, 483, 484, 678, 589, 590, 680, 495, 460, 482; 298/11; 254/10 R, 10 C; 280/656, 47.13

[56] References Cited

U.S. PATENT DOCUMENTS

| 497,952 | 5/1893 | Davis ............................ 254/10 R X |
| 1,329,995 | 2/1920 | Oubridge ........................ 254/10 C |
| 3,362,552 | 1/1968 | Thiele ............................ 414/469 X |
| 4,348,054 | 9/1982 | Shonkwiler et al. ................. 298/11 |
| 4,522,548 | 6/1985 | Oswald et al. .................... 414/589 X |

FOREIGN PATENT DOCUMENTS

| 0045398 | 2/1982 | European Pat. Off. ............ 414/477 |
| 547688 | 4/1932 | Fed. Rep. of Germany ...... 414/680 |
| 1952641 | 4/1971 | Fed. Rep. of Germany ...... 414/480 |
| 2754009 | 6/1978 | Fed. Rep. of Germany ...... 414/917 |

Primary Examiner—Frank E. Werner

[57] ABSTRACT

The present invention relates to a universal trailer having an outer frame defining the tongue and sides of the trailer with supporting wheels on either side of the outer frame. A load carrying bed is secured to an intermediate or sides of the outer frame by a mounting arrangement which include at least three link members rotatably secured to said frame and rotatably secured to the bed. The link members cause the load bearing bed to move from a position generally within said frame to a generally parallel position below the frame. The trailer also includes a lifting device for raising and lowering the bed within the frame, whereby the bed may be loaded at a position below the frame and subsequently raised to the position within the frame.

6 Claims, 5 Drawing Figures

U.S. Patent   Aug. 11, 1987   4,685,855
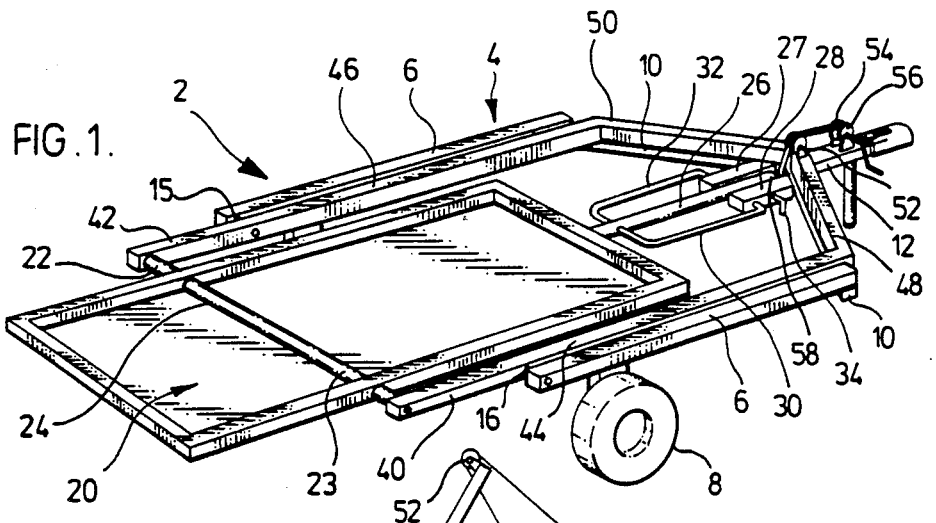
FIG. 1.
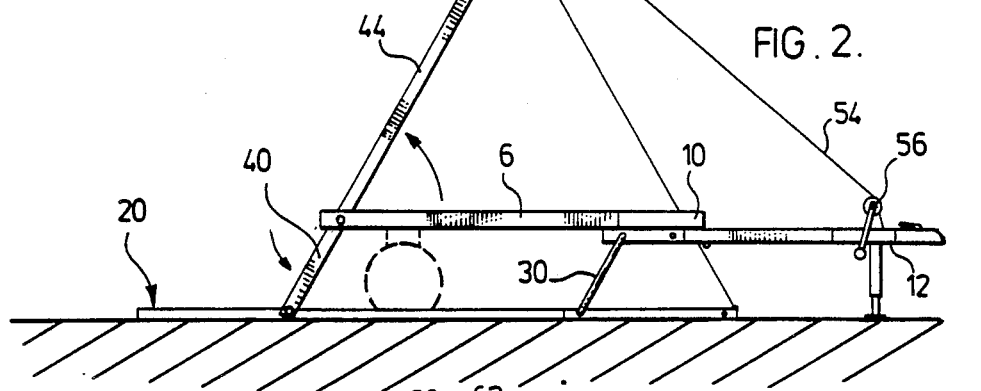
FIG. 2.
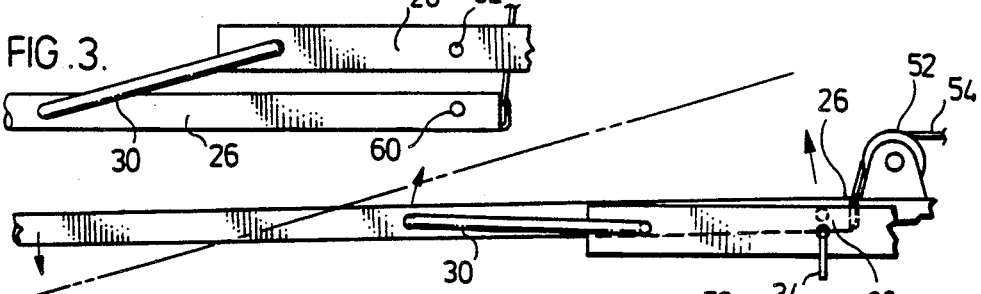
FIG. 3.
FIG. 4.
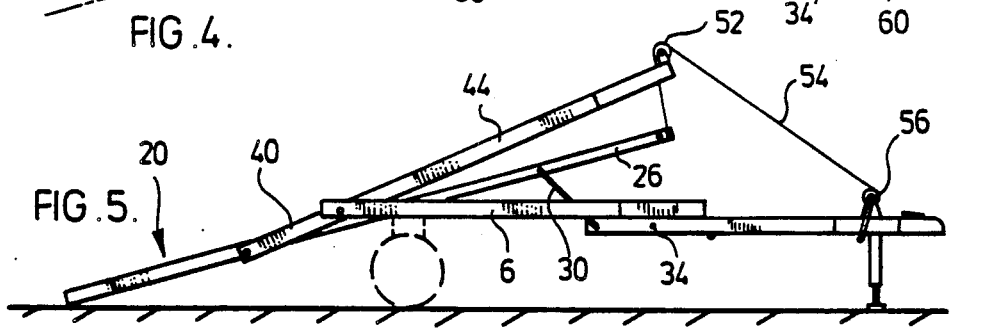
FIG. 5.

UNIVERSAL TRAILER

This is a continuation of application Ser. No. 666,159 filed Oct. 29, 1984, now abandoned.

FIELD OF THE INVENTION

The present invention relates to trailers and particularly relates to trailers having a load carrying bed capable of being lowered within the trailer.

BACKGROUND OF THE INVENTION

It is often desireable to load the bed of a trailer, which would be pulled behind a truck or car, at ground level and after the bed has been loaded it is then possible to raise the bed to a position within the trailer for transport. Such a trailer would be advantageous to a home owner moving such equipment as a refridgerator, washer, dryer or stove where it is difficult to raise such articles to the height of the trailer and position them on the load carrying bed. By having the bed drop to the ground level, this difficulty is avoided. Such a trailer is also useful for loading other equipment and could be adapted for snowmobiles, motorcycles and the like, and/or boats, for example.

Ground loading trailers have been proposed in the past as exemplified by U.S. Pat. No. 3,788,675, U.S. Pat. No. 2,478,795 and U.S. Pat. No. 2,953,266. Most of these patents generally utilize the pivot axis defined by the wheels of the trailer in combination with a pivot arrangement associated with the tongue of the trailer to drop the bed to the ground position. Because of the somewhat complicated relationship of these components, the bed often tips forward and subsequently moves to the back, or first is lowered at the back thereof such that the bed can be at several angles during the loading thereof. This presents problems with respect to the stability of the articles loaded on the trailer, as well as the changing characteristics of the trailer with respect to placement of the load. Furthermore, problems occur with these structures as the pivot access defined by the wheels of the trailer are offset relative to the trailer frame due to the suspension system which further changes the manner in which the bed is lower to the ground.

Although a ground loading trailer is desireable for many applications, it is often desirable to have a tilt load carrying bed to facilitate unloading of such material as gravel, sand or soil. Furthermore, such a tilt trailer would be desirable for launching boats.

According to the present invention, a universal trailer is possible which has improved characteristics with respect to the lowering of the load carrying bed.

SUMMARY OF THE INVENTION

A universal trailer according to the present invention, comprises an outer frame defining the tongue and sides of the trailer with supporting wheels either side of the outer frame. A load carrying bed is secured to and intermediate of the sides of the frame by mounting means. The mounting means includes at least three linked members rotatably secured to the frame and rotatably secured to the load carrying bed. The link members cause the load carrying bed to move from a generally coplanar position within said frame, to a generally parallel position below and relative to said frame. The trailer further includes means for raising and lowering the bed in the frame whereby the bed may be loaded from a position below said frame and subsequently raised to a generally coplanar position within the frame.

According to a preferred aspect of the invention, the means for mounting the load carrying bed within the outer frame, allows at least one of the links to move in a direction opposite the other links such that the rear end of the trailer is lowered relative to the tongue of the trailer with the forward end of the trailer remaining above the frame for angle loading or unloading of the trailer.

Thus, it is possible with the present invention to provide a universal trailer capable of having a load carrying bed positioned for ground loading thereof, or in a different orientation of the means for mounting the load carrying bed, it is possible to angle the load carrying bed for angled discharge.

BRIEF DESCRIPTION OF THE DRAWINGS

Preferred embodiments of the drawings are found in the drawings wherein:

FIG. 1 is a perspective view of the universal trailer;

FIG. 2 is an elevational view of the trailer showing ground loading of the load carrying bed;

FIG. 3 is a partial view of the forward end of the load carrying bed secured to the tongue of the trailer by link members;

FIG. 4 illustrates the first step in orientating the load carrying bed for angled discharge; and FIG. 5 is an elevation of the trailer in the angled discharged position.

DETAILED DESCRIPTION OF THE PREFERRED EMBODIMENTS

The universal trailer generally shown as 2 in the perspective view of FIG. 1 includes an outer frame 4 having side member 6 supporting wheels 8 either side of the outer frame with interconnecting angled member 10 connecting the side member 6 with the tongue of the trailer 12. The wheels may be connected in any suitable fashion to the frame and a suspension system could be provided. The wheels do not form part of the mounting arrangement for raising and lowering the bed. Within the outer frame the tongue includes two arm members 27 and 28 which define a space therebetween for receiving the extension 26 of the load carrying bed 20. The load carrying bed 20 is pivotally secured at points 22 and 23 to the link members 40 and 42 which are pivoted to the outer frame at positions 15 and 16. The link members include extensions thereof 44 and 46 secured by cross members 48 and 50 adjacent the tongue of the trailer. These links in combination with the extensions and members 48 and 50 define a lifting frame used to provide a mechanical advantage in lifting of the bed from the ground loading position generally shown in FIG. 2 or the angled loading position in FIG. 5 to the generally coplanar position of the load carrying bed relative to the frame of the trailer as shown in FIG. 1.

Adjacent the forward end of the load carrying bed 20 is extension member 26 which is received between the two arms 27 and 28 secured to the outer frame. A pair of link members 30 and 32 are pivotally secured to the arms 28 and 27 respectively and pivotally secured to the extension member 26. These link members in combination with link members 40 and 42 and the frame and bed preferrably define a parallelogram linkage whereby the link members in the generally coplanar position of the load carrying bed 20 within the outer frame 4 of the trailer are generally aligned such that link members 30 and 32 may be urged through the center point to effect a reverse rotation of these link relative to links 40 and 42 during angled discharge as generally shown in FIG. 5.

As shown in FIGS. 1 and 2 the winch generally designated as 56 is secured to the tongue 12 of the trailer and includes a cable 54 trained about pulley 52 secured to the lifting frame generally defined by extensions 44 and 46 in combination with the cross members 48 and 50. Thus the pulley 52 is secured adjacent the forward end of the lifting frame and the cable is then secured to the extension member 26 of the load carrying bed. By removing the pin 34 which locks the load carrying bed in the generally coplanar position as shown in FIG. 1, it is then possible to unwind cable from the winch 56 to allow the load carrying bed to move downwardly in a generally parallel relationship with the outer frame of the trailer to the ground loading position generally shown in FIG. 2. As links 40, 42, 30 and 32 generally define a parallelogram linkage the angulation of the load carrying bed relative to the frame maintains its parallel relationship. Furthermore, as the links rotate, the load carrying bed moves slightly forward relative to the frame. This movement of the load carrying bed to the ground loading position as shown in FIG. 2, forces the load carrying frame with the pulley 52 to the position as generally shown in FIG. 2. As can be appreciated, the extensions 44 and 46 provide a mechanical advantage when the winch 56 is operated to wind in the cable 54. In this way, fairly large loads can be easily raised once placed on the load carrying bed by this arrangement. The general movement of the links 30 and 32 and the extension member 26 relative to the arms 27 and 28 can be appreciated from FIG. 3. In addition, an aperture 62 is shown through the extension 28 and aperture is shown in the extension member 26 of the load carrying bed which in a generally coplanar position of FIG. 1, are aligned for receiving the locking pin 34. Once the locking pin is received within the aperture, the load carrying bed is fixed within the trailer.

Turning to FIGS. 4 and 5, the operation of the trailer will be explained.

As partially shown in FIG. 4, the outer frame 26 including the pulley 52 is above the extension 26 of the load carrying bed 20 and pulley 52 with the cable 54 is positioned such that it can draw the extension 26 upwardly whereby link 30 is drawn through its center point which would be the generally coplanar position of FIG. 1. The pin 34 can then be replaced in aperture 62 of arms 26 and 27 whereby the extension 26 now rests on this pin. Upon subsequent unwinding of cable 54, both the lifting frame and extension 26 of the load carrying bed are moved upwardly while the rear links 40 and 42 move downwardly until the load carrying bed strikes the ground.

In order to return the load carrying bed from the angled discharged position of FIG. 5, the cable is again wound on winch 56 urging the load carrying frame downwardly, causing the rear portion of the load carrying bed to be raised by legs 40 and 42 and causing the forward portion of the bed to move downwardly guided by the movements of links 30 and 32. In this case, it may be desireable to move the cable from extension 26 of the load carrying bed and secured to the outer frame such that the extension is not being urged in two directions. It is advantageous to have the cable secured to this extension during the ground loading operation as shown in FIG. 2, however it is slightly preferrable to have it secured to the outer frame when used in the angled discharged position.

When the load carrying frame has been brought into abutment with the outer frame of the trailer, extension 26 will be received between the arms 27 and 28 such that aperture 60 and 62 align and pin 34 may be reinserted into the aperture locking the load carrying bed in the coplanar position.

Although the application has been described with respect to the use of a parallelogram linkage defined by links 30, 32, 40, 42, the load carrying bed 20 and the outer frame of the trailer, it can be appreciated that other linkage arrangements are possible. In the case of a linkage arrangement other than the parallelogram linkage, it may be necessary to provide a slot in one of the connections of the forward link members 30 and 32 for example, to allow the linkage arrangement to pass through the center position in order to achieve the opposite rotation of these link members relative to links 40 and 42 for angled discharge. Certainly the invention is not limited to the use of a parallelogram linkage, although this is preferred.

Furthermore, the use of the trailer has been described with respect to the mechanical advantages provide by the extensions 44 and 46 interconnected by members 50 and 48 at the forward portion of the trailer. Such a mechanical advantage can be provided in another manner such as the use of pulleys and cables associated with the outer frame and the individual link members, particularly links 40 and 42. Once again, the use of the lifting frame is preferred, however other lifting arrangements could be provided while still using the link mounting arrangement for securing the load carrying bed within the outer frame of the trailer.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A trailer comprising
   an outer frame defining the tongue and sides of the trailer with supporting wheels on either side of said outer frame,
   a load carrying bed secured to and generally intermediate the sides of said frame by mounting means, said mounting means including at least three link members pivotally secured to said outer frame and pivotally secured to said bed,
   a pair of said link members being secured to said outer frame adjacent the rear portion thereof and to opposite sides of said outer frame with said pair of link members being interconnected by said bed to move as a unit for lifting and lowering the rear portion of said bed,
   at least one of said link members other than said pair of link members being pivotally secured adjacent the forward portion of said bed and pivotally secured adjacent the forward portion of said outer frame for lifting and lowering the front portion of said bed,
   said link members causing said load carrying bed to move from a transporting position generally within said frame to a generally parallel bed ground loading or unloading position below said frame, means for selectively determining the direction of rotation of said at least one of said link members secured to the forward portion of the bed to effect movement of said bed from said transporting position to ground loading or unloading in one direction of rotation of said at least one of said link members and to effect angled loading or unloading of said load carrying bed in the opposite direction of rotation of said at least one of said link members secured to the forward portion of the bed, and means for raising and lowering said bed, said means for raising and lowering said bed including a forwardly extending lever arm means rigidly connected to one of said pair of links which cooperates with a cable and winch means secured to said outer frame, said cable and winch means interconnecting said outer frame and said lever arm means to effect controlled movement of said bed between positions, said lever arm means providing a mechanical advantage in moving said bed and any load thereon to or from the transporting position.

2. A trailer comprising an open ended outer frame to which wheels of the trailer are secured, a load carrying bed having a front and rear portion secured to and generally intermediate the sides of said outer frame by a linkage arrangement, said linkage arrangement in vertical section defining a four bar linkage with each link thereof pivotally secured to said bed and to said outer frame, said links of said four bar linkage being spaced in the length of said trailer to thereby define associated forward and rearward links, said linkage determining movement of said bed relative to said outer frame from a ground loading position with said bed generally horizontal and below said outer frame to a transporting position with said bed generally within and parallel to said outer frame, to an angled loading or unloading position with said bed tilted rearwardly relative to said outer frame; said linkage operating such that rearward links rotate in the same direction during movement of the bed from the transport position to either of the angled loading or ground loading positions, while the forward links rotate in the same direction as said rearward links when said bed is moved from the transport position to the ground loading position and rotate in the opposite direction when said bed is moved from the transporting position to the angled loading or unloading position, and means for selectively causing said forward link to pass through a center position and thereby determine its direction of rotation when the bed is moved from the transport position to effect either ground loading or angled loading, and wherein at least one of said links secured to said rear portion includes a forwardly extending lever arm means rigidly connected to said link, said lever arm means cooperating with a cable and winch means secured to said outer frame, said cable and winch means interconnecting said outer frame and said lever arm means to effect controlled movement of said bed between positions, said lever arm means providing a mechanical advantage in moving said bed and any load thereon to or from the transporting position.

3. A trailer as claimed in claim 2, wherein said lever arm means is a generally 'U' shaped lifting frame interconnecting a pair of rearward links located either side of said bed, said 'U' shaped lifting frame being of a shape to cooperate with said bed in a manner to leave said bed at least substantially unobstructed when said bed is in the transporting position.

4. A trailer as claimed in claim 3, wherein said cable is trained over a pulley arrangement generally centrally disposed on said 'U' shaped lifting frame adjacent the forward portion of the bed and connected to said bed adjacent the forward portion such that the cable is engaged by said 'U' shaped lifting frame between said bed and said outer frame.

5. A trailer as claimed in claim 4, wherein said linkage includes two symmetrical four bar linkages disposed either side of said load carrying bed.

6. A trailer as claimed in claim 2, wherein said forward and rearward links define a four bar parallelogram linkage.

* * * * *